No. 621,232. Patented Mar. 14, 1899.
C. C. DUPRE.
POTATO DIGGER.
(Application filed Dec. 10, 1898.)
(No Model.)
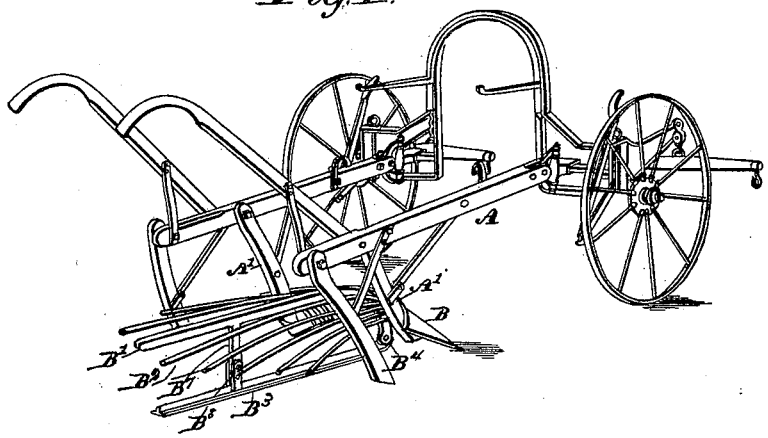
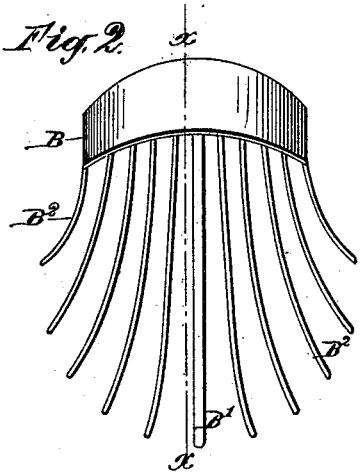
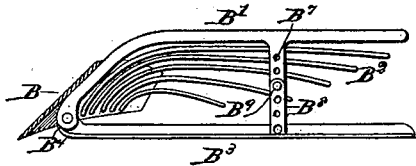
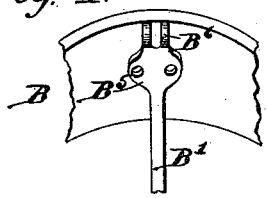
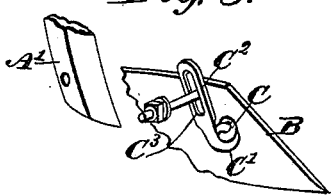

UNITED STATES PATENT OFFICE.

CELLESTIAN C. DUPRE, OF VINING, IOWA.

POTATO-DIGGER.

SPECIFICATION forming part of Letters Patent No. 621,232, dated March 14, 1899.

Application filed December 10, 1898. Serial No. 698,943. (No model.)

*To all whom it may concern:*

Be it known that I, CELLESTIAN C. DUPRE, a citizen of the United States, residing at Vining, in the county of Tama and State of Iowa, have invented certain new and useful Improvements in Potato-Diggers; and I do hereby declare the following to be a full, clear, and exact description of the invention, such as will enable others skilled in the art to which it appertains to make and use the same.

The object of this invention is to so construct a potato-digger that it may do its work properly and without the clogging and tangling of vines common to the use of potato-diggers in general use.

The nature of the invention is fully disclosed in the description and claims following, reference being had to the accompanying drawings, in which—

Figure 1 is a rear view of a potato-digger embodying my invention as seen in perspective and applied to a cultivator. Fig. 2 is a top view of the digger detached. Fig. 3 is a sectional view of the same in the line $x\ x$ of Fig. 2. Fig. 4 is a fragmentary bottom view showing the attachment of the middle finger of the digger to the shovel. Fig. 5 is a fragmentary view in perspective, showing means for connecting the ends of the shovel with suitable standards. Fig. 6 shows a modified form of attaching device adapted for standards having cylindrical shanks.

Similar letters of reference indicate corresponding parts.

The device is of such a nature as to be readily applicable to an ordinary two-horse cultivator and is so illustrated in Fig. 1. It is to be understood, however, that almost any sort of a wheeled frame having two downwardly-extending standards would serve the same purpose, one of the essential objects I have in view being the straddling of the potato-hills by the standards, so that the vines do not become entangled with them and clog up the machine.

Referring now to the drawings, A denotes a two-horse cultivator of a well-known type provided with suitable standards A'. To the two inner standards is attached the shovel B of a potato-digger, from which extends backwardly and divergently a series of fingers B' and B². The digger is in the main similar to those in common use, but differs in certain respects, as will appear by what follows: In applying a potato-digger to running-gear of this nature it is desirable to provide for a certain freedom of movement on the part of the digger independent of the motion of the running-gear. Otherwise the uneven movement of the running-gear in going over the uneven ground of a potato-field would be imparted to the digger, causing it to run very hard and with unsatisfactory results. I accordingly connect the shovel of the digger to the standards by a connection which admits of considerable oscillation of the running-gear without disturbing the even and steady movement of the shovel forward. The nature of this construction is shown in Figs. 5 and 6. Each end of the shovel is attached by an eye-bolt C, suitably riveted to the shovel, to a corresponding eye C', forming a part of a shank-plate $C^2$. The shank-iron (shown in Fig. 5) may be attached to a wooden standard by a bolt passing through both. To admit of vertical adjustment, the shank-iron is slotted at $C^3$. By this means it becomes possible to vary the depth of the shovel or to set one side higher and the other lower, as might be necessary on working on a side hill.

In the case of cylindrical standards the shank-iron $C^4$ may be made tubular, as shown in Fig. 6.

The depth of cut of the shovel and also the evenness of its movement are regulated by a shoe or runner $B^3$, pivoted at $B^4$ near the middle and lower edge of the shovel. Directly above this runner is the middle finger B', fastened securely to the back face of the shovel. For this purpose the finger may be flanged at $B^5$, as shown in Fig. 4, and riveted to the shovel. The lower end of the finger may also be provided with lugs $B^6$ to serve for a hinge in connection with the front end of the shoe, as above indicated. Toward the rear end the finger has a downward extension $B^7$ with a number of holes therein and engages with a corresponding upward extension $B^8$, attached to or forming a part of the shoe. The relative pitch of the shovel may thus be adjusted by raising or depressing the fingers relative to the shoe, a pin or bolt $B^9$ serving to secure the parts at any desired point. In practice this shoe serves the same purpose as the "landside" of a plow and carries the digger in a steady and even course through the ground.

Having thus described my invention, what I claim as new, and desire to secure by Letters Patent, is—

1. In a potato-digger, the combination of a digging-shovel provided with backwardly-extending fingers, a pair of standards connected with suitable draft apparatus, and adapted to straddle the potato-hills, and a connection of each side of said shovel with its corresponding standard by a universal joint, substantially as and for the purpose set forth.

2. The herein-described potato-digger, consisting essentially of a shovel, a series of backwardly-extending fingers attached thereto, a central shoe with its bottom about in line with the lowest part of the shovel, and means substantially as described for connecting it adjustably with one of said fingers.

3. A potato-digger having an excavating-shovel, a series of backwardly-extending fingers secured to said shovel, the middle finger being provided with a downward extension some distance back from the shovel, a shoe hinged to the lower, back part of the shovel below the middle finger, and having an upwardly-extending member adapted to engage with the downward extension of the finger, with holes in said engaging parts, and a pin or bolt to connect them adjustably, substantially as described.

4. The combination in a potato-digger, of excavating apparatus, substantially as described, a pair of standards adapted to straddle the hills, a vertically-adjustable shank-iron to connect with each standard, and a connection of each shank-iron with the shovel by a universal joint.

In testimony whereof I affix my signature in presence of two witnesses.

CELLESTIAN C. DUPRE.

Witnesses:
J. F. GROAT,
J. M. ST. JOHN.